United States Patent
Schaake et al.

(10) Patent No.: US 10,137,753 B2
(45) Date of Patent: Nov. 27, 2018

(54) AIR GUIDE HOUSING AND VENTILATION, HEATING OR AIR CONDITIONING SYSTEM WITH SUCH AN AIR GUIDE HOUSING

(71) Applicant: MAHLE International GmbH, Stuttgart (DE)

(72) Inventors: Norman Schaake, Markgroeningen (DE); Andreas Pfander, Weinstadt (DE)

(73) Assignee: MAHLE International GmbH, Stuttgart (DE)

( * ) Notice: Subject to any disclaimer, the term of this patent is extended or adjusted under 35 U.S.C. 154(b) by 12 days.

(21) Appl. No.: 15/241,397

(22) Filed: Aug. 19, 2016

(65) Prior Publication Data
US 2017/0066302 A1    Mar. 9, 2017

(30) Foreign Application Priority Data

Sep. 9, 2015 (DE) .......................... 10 2015 217 245

(51) Int. Cl.
| | |
|---|---|
| *B60H 1/00* | (2006.01) |
| *B01D 46/00* | (2006.01) |
| *B01D 46/42* | (2006.01) |
| *B60H 3/06* | (2006.01) |
| *F04D 29/42* | (2006.01) |

(52) U.S. Cl.
CPC ..... *B60H 1/00514* (2013.01); *B01D 46/0041* (2013.01); *B01D 46/4236* (2013.01);
(Continued)

(58) Field of Classification Search
CPC ........ B01D 45/12; B01D 45/16; B01D 50/00; F15D 1/00; F15D 1/0015; B60H 1/00;
(Continued)

(56) References Cited

U.S. PATENT DOCUMENTS 3,618,303 A * 11/1971 Nagel ................... B01D 45/16
55/337
5,601,142 A * 2/1997 Hildebrand ........ B60H 1/00035
165/137
(Continued)

FOREIGN PATENT DOCUMENTS

| DE | 199 44 175 A1 | 3/2001 |
|---|---|---|
| EP | 2786885 A1 | 10/2014 |
| JP | 2003-136937 A | 5/2003 |

*Primary Examiner* — Duane Smith
*Assistant Examiner* — Minh Chau T Pham
(74) *Attorney, Agent, or Firm* — Muncy, Geissler, Olds & Lowe, P.C.

(57) ABSTRACT

An air guide housing, in particular for a ventilation, heating or air conditioning system of a vehicle, with at least one first air inlet opening, wherein the at least one first air inlet opening has a cross sectional area which is arranged substantially vertical to a first axis, and with at least one second air inlet opening, wherein the at least one second air inlet opening has a cross sectional area which is arranged substantially vertical to a second axis, and having at least one air outlet opening, wherein the at least one air outlet opening has a cross sectional area which is arranged essentially vertical to a third axis, and with a fan impeller for suctioning air into the air guide housing. The second axis and the third axis are arranged substantially parallel to one another.

13 Claims, 3 Drawing Sheets

(52) U.S. Cl.
CPC ..... *B60H 1/00021* (2013.01); *B60H 1/00028* (2013.01); *B60H 1/00464* (2013.01); *B60H 3/0608* (2013.01); *F04D 29/424* (2013.01); *B01D 2279/40* (2013.01); *B60H 2001/006* (2013.01); *B60H 2001/00085* (2013.01); *B60H 2001/00607* (2013.01)

(58) Field of Classification Search
CPC .. B60H 3/06; B60H 1/00464; B60H 1/00849; B60H 3/0625; B60H 2003/0691; B60H 1/26; B60H 2001/00085; B60H 2001/00214; B60K 11/04; B62D 25/08; B62D 25/081; F24F 13/24
USPC .... 55/337, 454, 457, 460, 385.3; 123/198 E, 123/41.04; 96/380, 383, 386; 454/184
See application file for complete search history.

(56) References Cited

U.S. PATENT DOCUMENTS

| | | | |
|---|---|---|---|
| 5,709,182 A * | 1/1998 | Espe | F02B 27/02 123/184.55 |
| 8,137,425 B2 * | 3/2012 | Saito | F02M 35/02 123/198 E |
| 8,657,901 B2 * | 2/2014 | Chapman | B01D 45/16 55/343 |
| 8,657,932 B2 * | 2/2014 | Huziwara | B04C 3/06 55/419 |
| 8,945,264 B2 * | 2/2015 | Craig | B04C 5/04 55/315 |
| 9,359,981 B1 * | 6/2016 | Waisanen | F02M 35/167 |
| 2002/0016147 A1 * | 2/2002 | Muller | B60H 1/00671 454/156 |
| 2006/0065389 A1 | 3/2006 | Huang et al. | |
| 2010/0074728 A1 * | 3/2010 | Sinzaki | F04D 29/66 415/119 |
| 2010/0300292 A1 * | 12/2010 | Ishihara | B01D 46/00 95/284 |
| 2012/0000363 A1 | 1/2012 | Mizutani et al. | |
| 2012/0180998 A1 | 7/2012 | Nishioka et al. | |
| 2014/0299076 A1 | 10/2014 | Tamakoshi | |
| 2015/0147951 A1 * | 5/2015 | Funada | H05K 7/206 454/184 |
| 2017/0232816 A1 * | 8/2017 | Kullen | B60H 1/00064 165/59 |

* cited by examiner

AIR GUIDE HOUSING AND VENTILATION, HEATING OR AIR CONDITIONING SYSTEM WITH SUCH AN AIR GUIDE HOUSING

This nonprovisional application claims priority under 35 U.S.C. § 119(a) to German Patent Application No. 10 2015 217 245.7, which was filed in Germany on Sep. 9, 2015, and which is herein incorporated by reference.

BACKGROUND OF THE INVENTION

Field of the Invention

The invention relates to an air guide housing and to a ventilation, heating or air conditioning system.

Description of the Background Art

DE 199 44 175 A1 discloses a heating or air conditioning system for a motor vehicle with an air induction body arranged on the suction side upstream of a fan, which in each case is associated with at least one alternately closable and openable air inlet opening for fresh air and circulating air, wherein at least one air filter for purifying fresh air is provided and an air distribution housing is arranged on the pressure side downstream of the fan. Upstream of the fan, an intake socket having air inlet openings and associated with the air induction body, is arranged, on which circumference a metering device for the air intake openings is attached, wherein the axis of the metering device runs coaxially to the axis of the fan in the vehicle direction.

The device disclosed in the above prior art exhibits a relatively high level of unwanted operational noise during operation. A ventilation, heating or air conditioning system which air guide housing has a quieter background noise during operation, is therefore advantageous.

SUMMARY OF THE INVENTION

It is therefore an object of the invention to provide an improved air guide housing which exhibits less noise during operation. Also, it is an object of the invention to provide a ventilation, heating or air conditioning system which has such an air guide housing.

An embodiment of the invention provides an air guide housing, especially for a ventilation, heating or air conditioning system of a vehicle, with at least one first air inlet opening, the at least one first air inlet opening having a cross sectional area which is disposed substantially vertical to a first axis, and with at least one second air inlet opening, the at least second air inlet opening having a cross sectional area which is arranged essentially vertical to a second axis, and having at least one air outlet opening, the at least one air outlet opening having a cross sectional area which is arranged essentially vertical to a third axis, and having a fan impeller for suctioning air into the air guide housing. In this case, the second axis and the third axis are arranged substantially parallel to each other. Advantageously, the noise resulting from the delivery of air through the air guide housing is thereby reduced.

In an embodiment of the air guide housing, the first axis and the second axis are arranged to one another at an angle of about 90°, and the first axis and the third axis are arranged to each other at an angle of about 90°. The noise level produced by the air delivery in the air guide housing is thereby again significantly reduced.

An embodiment of the air guide housing provides that the at least one first air inlet opening is fluidly connected to a fresh air channel, whereby fresh air from the surroundings of the vehicle is suctioned into the air guide housing via the fresh air channel through the at least one first air inlet opening.

In an embodiment of the air guide housing, circulating air is suctioned from a circulating air duct and/or a cabin of the vehicle into the air guide housing through the at least one second air inlet opening.

An embodiment of the air guide housing provides that the fan impeller is rotatably mounted about a fourth axis, wherein the second axis and the fourth axis are substantially arranged to each other at an angle of about 90°. Direct sound radiation into a vehicle interior is thereby avoided.

In an embodiment of the air guide housing, the first axis and the fourth axis are arranged substantially parallel to each other and the third axis and the fourth axis are arranged to one another at an angle of about 90°.

In an embodiment of the air guide housing, an air filter is arranged downstream of the at least one air outlet opening in the air flow direction.

An embodiment of the air guide housing provides that connecting elements for connecting the air guide housing with a fluid channel array can be arranged in the region of the at least one first air inlet opening and/or in the region of the at least one second air inlet opening and/or in the region of the at least one air outlet opening. This allows for the air guidance housing to be easily integrated into a ventilation, heating or air conditioning system.

In an embodiment of the air guide housing, at least one air flow control device and/or at least one air flow control assembly for selective and/or partially metered suctioning and/or ventilation of the air guide housing with fresh air and/or circulating air is arranged in the region of the air guide housing and/or in an area adjacent to the air guide housing.

An embodiment of the ventilation, heating or air conditioning system provides that the ventilation, heating or air conditioning system has at least one air guide housing configured in accordance with the above description.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
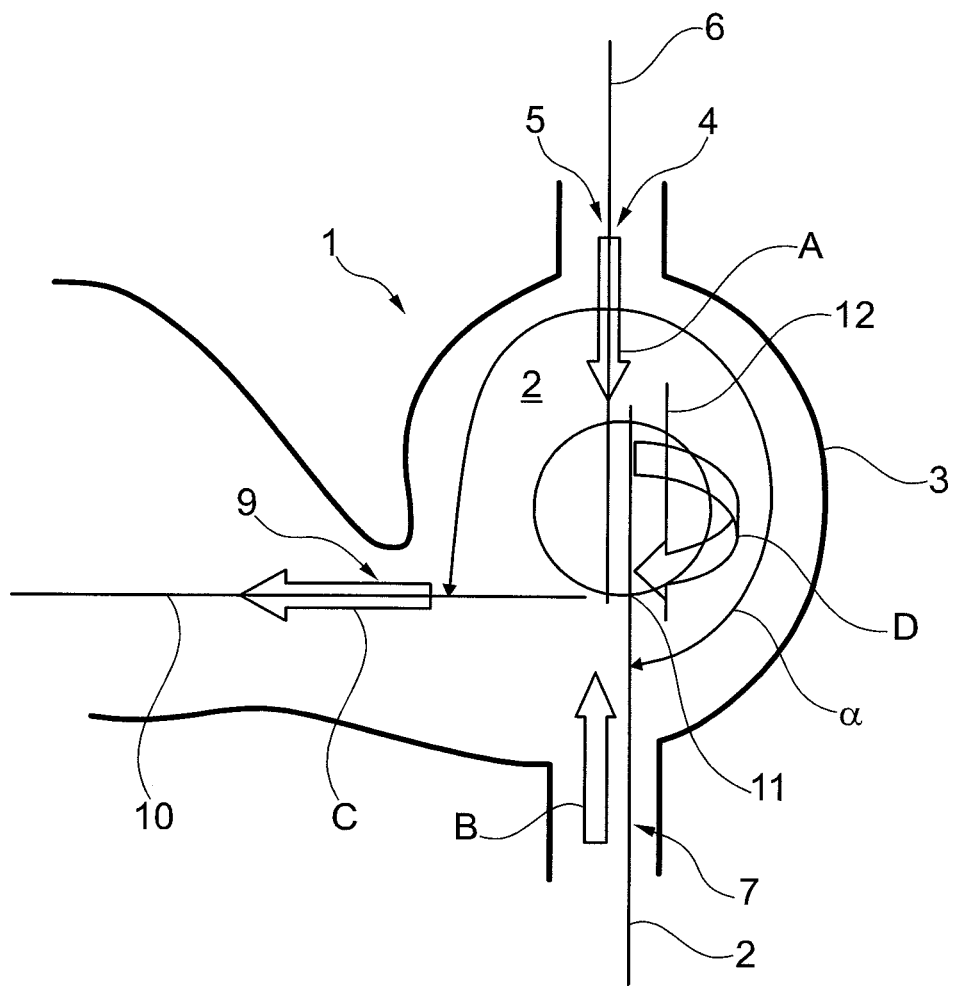
FIG. 1 is a sectional view of an air guide housing according to the conventional art.

FIG. 1 shows a schematic sectional view of an air guide housing 1 according to the prior art, which is an exemplary part of a ventilation, heating or air conditioning system that is not shown. The air guide housing 1 has a chamber 2 with a chamber wall 3. On the chamber wall 3, a first air inlet opening 4 is disposed. The first air inlet opening 4 is used by way of example as a fresh air inlet opening 5 which is fluidly connected to a not shown fresh air channel. The first air inlet opening 4 has, for example, a round or square shaped cross section. The cross sectional area of the first air inlet opening 4 thereby forms a first plane which is disposed substantially perpendicular to a first axis 6. By way of example, the first axis 6 extends through the chamber 2 and roughly cuts through the center of the chamber 2 in the embodiment shown in FIG. 1. The inflow direction of the fresh air flowing through the first air inlet opening 4 into the chamber 2 is disposed substantially parallel to the first axis, and is illustrated in FIG. 1 by the arrow a.

In one of the areas of the chamber wall 3 substantially opposite the first air inlet opening 4, a second air inlet opening 7 is disposed. The second air inlet opening 7 is fluidly connected by way of example with a not shown circulating duct and/or with the vehicle cabin. The second air inlet opening 7 by way of example has a round or square shaped cross section. The cross sectional area of the second air inlet opening 7 forms a second plane which is substantially perpendicular to a second axis 8. By way of example, in the embodiment shown in FIG. 1, the second axis 8 extends through the chamber 2 and cuts roughly through the center of the chamber 2. The inflow direction of air flowing through the second air inlet opening 7 into the chamber 2 is substantially disposed parallel to the second axis 8 and is shown in FIG. 1 by the arrow B.

The first axis 6 is arranged substantially parallel to the second axis 8.

Moreover, the air guide housing 1 has an air outlet opening 9 formed in the chamber wall 3. The air outlet opening 9 is fluidly connected by way of example to a not shown air outlet duct and/or the vehicle cabin. Here, the air outlet opening 9 by way of example has a round or square shaped cross section. The cross sectional area of the air outlet opening 9 forms a third plane which is disposed substantially perpendicular to a third axis 10. By way of example, the third axis 10 extends through the chamber 2. The discharge direction of air flowing through the air outlet opening 9 from the chamber 2 is arranged substantially perpendicular to the first axis 6 and perpendicular to the second axis 8 and is illustrated in FIG. 1 by the arrow C.

The third axis 10 and the second axis 8 are arranged substantially relative to one another. An angle α located between the third axis 10 and the second axis 8 amounts to approximately 270°.

In the chamber 3, a fan impeller 11 is arranged, which suctions air over the first air inlet opening 4 and/or the second air inlet opening 7 into the chamber 2 and conveys the air out of the chamber 2 through the air outlet opening 9.

The fan impeller 11 is rotatably supported about a fourth axis 12. The fourth axis 12 is disposed substantially parallel to the first axis 6 and parallel to the second axis 8. In addition, the fourth axis 12 is located perpendicular to the third axis 10.

The direction of rotation of the fan impeller 1 is indicated by the arrow D in FIG. 1. The rotation direction D forms a circular surface that vertically intersects the cross sectional areas formed by the first air inlet opening 4 and the second air inlet opening 7, and by the air outlet opening 9. Here, the first air inlet opening 4 is located in the direction of rotation D of the fan impeller 11 upstream of the second air inlet opening 7, and the second air inlet opening 7 is located in the direction of rotation D of the fan impeller 11 upstream of the air outlet opening 9.

Figure 2:
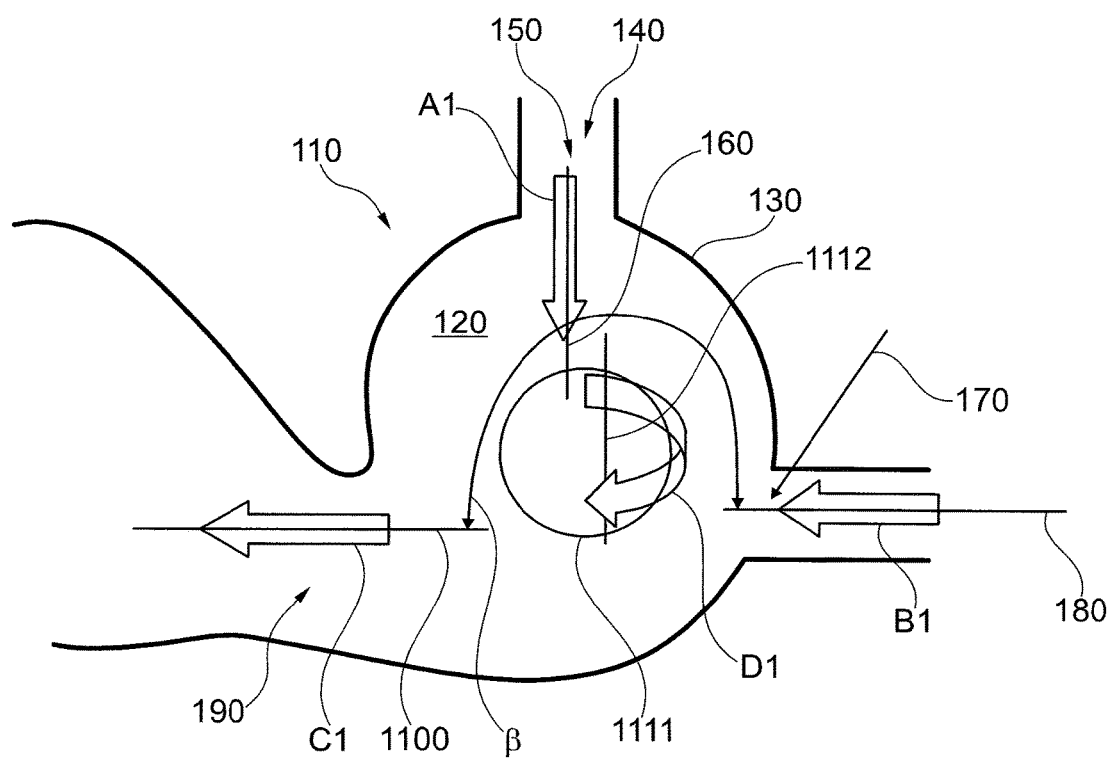
FIG. 2 is a sectional view of an embodiment of an air guide housing according to an exemplary embodiment of the invention.

FIG. 2 shows a schematic sectional view of an air guide housing 110 according to the invention, which by way of example is part of a not shown ventilation, heating or air conditioning system. The air guide housing 110 includes a chamber 120 having a chamber wall 130. On the chamber wall 130, a first air inlet opening 140 is arranged. The first air inlet opening 140 is used by way of example as a fresh air inlet opening 150 which is fluidly connected to a not shown fresh air channel. The first air inlet opening 140 has, for example, a round or square shaped cross section.

The cross sectional area of the first air inlet opening 140 thereby defines a first plane, which is arranged substantially perpendicular to a first axis 160. By way of example, the first axis 160 extends through the chamber 120 and cuts roughly through the center of the chamber 120 in the embodiment shown in FIG. 2. The inflow direction of fresh air flowing through the first air inlet opening 140 into the chamber 120 is arranged substantially parallel to the first axis and is shown by the arrow A1 in FIG. 1.

In addition, a second air inlet opening 170 is disposed on the chamber wall 130. By way of example, the second air inlet opening 170 is fluidly connected with a not shown circulating duct and/or with the vehicle cabin. Here, the second air inlet opening 170 by way of example has a round or square shaped cross section. The cross sectional area of the second air inlet opening 170 defines a second plane which is disposed substantially perpendicular to a second axis 180. By way of example, the second axis 180 thereby extends through the chamber 120 and cuts roughly through the center of the chamber 120 in the embodiment shown in FIG. 2. The inflow direction of the circulating air passing through the second air inlet opening 170 into the chamber 120 is disposed substantially parallel to the second axis and is shown in FIG. 2 by the arrow B1.

The first axis 160 is disposed substantially perpendicular to the second axis 180.

Moreover, the air guide housing 110 has an air outlet opening 190 formed in the chamber wall 130. The air outlet opening 190 by way of example is fluidly connected to a not shown air outlet duct and/or the vehicle cabin. Here, the air outlet opening 190 is by way of example a round or square shaped cross section. The cross sectional area of the air outlet opening 190 defines a third plane which is disposed substantially perpendicular to a third axis 1100. The third axis 1100 by way of example extends through the chamber 120. The outflow direction of the air flowing through the air outlet opening 190 from the chamber 120 is disposed substantially perpendicular to the first axis 160 and parallel to the second axis 180 and is illustrated in FIG. 2 by the arrow C1.

The third axis 1100 and the second axis 180 are arranged substantially parallel to each other.

Consequently, the angle β between the third axis 1100 and the second axis 180 amounts to about 180°.

A fan impeller 1111 is disposed in the chamber 120 which suctions air through the first air inlet opening 140 and/or the second air inlet opening 170 into the chamber 120 and transports the air through the air outlet opening 190 out of the chamber 120.

The fan impeller 1111 is rotatably arranged about a fourth axis 1112. The fourth axis 1112 is arranged substantially perpendicular parallel to the first axis 160 and perpendicular to the second axis 180. In addition, the fourth axis 1112 is disposed perpendicular to the third axis 1100.

The direction of rotation of the fan impeller is labeled in FIG. 2 by the arrow D1. The direction of rotation D1 forms a circular surface that vertically intersects the cross sectional areas formed by the first air inlet opening 140 and the second air inlet opening 170, and by the air outlet opening 190. Here, the first air inlet opening 140 is located upstream of the second air inlet opening 170 in the direction of rotation D1 of the fan impeller 1111, and the second air inlet opening 170 is located upstream of the air outlet opening 190 in the direction of rotation D1 of the fan impeller 1111.

Figure 3:
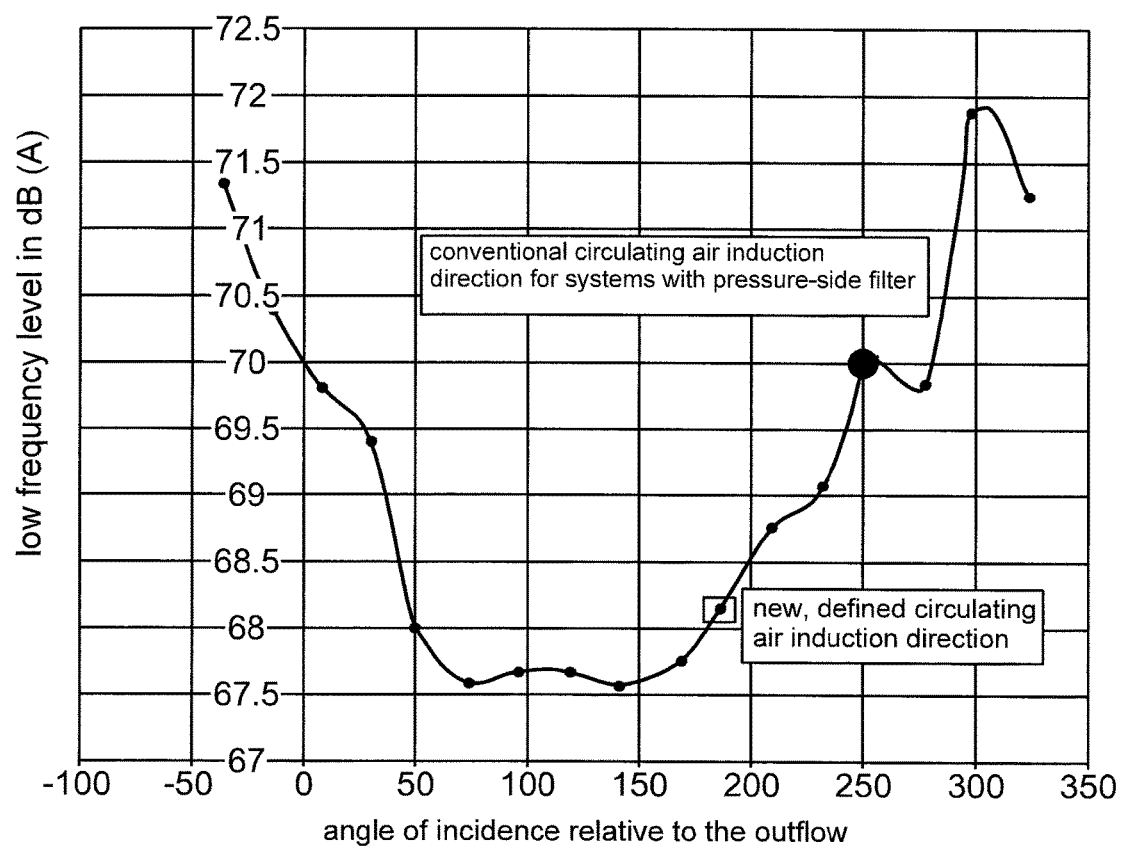
FIG. 3 is a curve diagram.

FIG. 3 shows a diagram which compares the air guide housing 1 described in FIG. 1 and belonging to the prior art to the inventive air guide housing 110 illustrated in FIG. 2. The comparison relates to the noise level (indicated in decibel) occurring in each case in the low frequency band range in terms of the angle α, β, at which the inflow direction of the circulating air coming in through the second air inlet opening 7, 170 into the chamber 2, 120 is arranged with respect to the outflow direction of the air flowing through the air outlet opening 9, 190 out of the chamber 2, 120.

In the example shown in FIG. 1 of an air guide housing 1 according to the prior art, the angle α is about 270°. In this case, the low frequency band range is about 70 decibels.

For the embodiment of an air guide housing 110 according to the invention shown in FIG. 2, the angle β is about 180°. Here, the low frequency band range shown in the curve diagram illustrated in FIG. 3 is approximately 68 decibels.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air guide housing for a ventilation, heating or air conditioning system of a vehicle, the air guide housing comprising:
    at least one first air inlet opening having a cross sectional area which is disposed substantially vertical to a first axis;
    at least one second air inlet opening having a cross sectional area which is arranged substantially vertical to a second axis;
    at least one air outlet opening having a cross sectional area which is arranged essentially vertical to a third axis; and
    a fan impeller for suctioning air into the air guide housing, the fan impeller disposed in a center of the air guide housing such that the at least one first air inlet opening is located in a direction of rotation of the fan impeller upstream of the at least one second air inlet opening and the at least one second air inlet opening is located in the direction of rotation of the fan impeller upstream of the at least one air outlet opening, and
    wherein the second axis and the third axis are arranged substantially parallel to each other.

2. The air guide housing according to claim 1, wherein the first axis and the second axis are arranged to each other at an angle of about 90°, and wherein the first axis and the third axis are arranged to one another at an angle of about 90°.

3. The air guide housing according to claim 1, wherein the at least one first air inlet opening is fluidly connected to a fresh air channel, wherein fresh air from the surroundings of the vehicle is suctioned via the fresh air channel through the at least one first air inlet opening into the air guide housing.

4. The air guide housing according to claim 1, wherein, through the at least one second air inlet opening, circulating air is suctioned from an air circulating duct and/or from a cabin of the vehicle into the air guide housing.

5. The air guide housing according to claim 1, wherein the fan impeller is rotatably mounted about a fourth axis, wherein the second axis and the fourth axis are arranged to each other substantially at an angle of about 90°.

6. The air guide housing according to claim 5, wherein the first axis and the fourth axis are arranged substantially parallel to each other, and wherein the third axis and the fourth axis are arranged to each other at an angle of about 90°.

7. The air guide housing according to claim 1, wherein an air filter is arranged in an air flow direction downstream of the at least one air outlet opening.

8. The air guide housing according to claim 1, wherein, in the region of the at least one first air inlet opening and/or in the region of the at least one second air inlet opening and/or in the region of the at least one air outlet opening, connecting elements for connecting the air guide housing are formed with a fluid channel array.

9. The air guide housing according to claim 1, wherein, in the region of the air guide housing and/or in a region adjacent to the air guide housing, at least one air flow control device and/or at least one air flow control assembly for selective and/or partially metered suctioning and/or ventilation of the air guide housing with fresh air and/or circulating air is arranged.

10. A ventilation, heating or air conditioning system, wherein the ventilation, heating or air conditioning system comprises at least one air guide housing according to claim 1.

11. An air guide housing, comprising:
    a first air inlet;
    a second air inlet disposed perpendicular to the first air inlet;
    an air outlet disposed parallel to the second air inlet and perpendicular to the first air inlet; and
    a fan impeller for suctioning air into the air guide housing through the first air inlet and the second air inlet, the fan impeller disposed in a center of the air guide housing such that the first air inlet is located in a direction of rotation of the fan impeller upstream of the second air inlet and the second air inlet opening is located in the direction of rotation of the fan impeller upstream of the air outlet,
    wherein an angle between the third axis and the second axis is approximately 180°.

12. The air guide housing according to claim 11, wherein the first air inlet has a cross sectional area that is disposed vertical to a first axis, the second air inlet has a cross sectional area that is arranged vertical to a second axis and the air outlet has a cross sectional area arranged vertical to a third axis.

13. An air guide housing, comprising:
    a first air inlet;
    a second air inlet disposed perpendicular to the first air inlet;
    an air outlet disposed parallel to the second air inlet and perpendicular to the first air inlet; and
    a fan impeller for suctioning air into the air guide housing through the first air inlet and the second air inlet, the fan impeller disposed in a center of the air guide housing such that the first air inlet is located in a direction of rotation of the fan impeller upstream of the second air inlet and the second air inlet is located in the direction of rotation of the fan impeller upstream of the air outlet.

\* \* \* \* \*